United States Patent [19]

Kunimune et al.

[11] Patent Number: 5,071,908
[45] Date of Patent: Dec. 10, 1991

[54] SILICON POLYIMIDE PRECURSOR COMPOSITION

[75] Inventors: Kouichi Kunimune, Ichihara; Ryuji Kobayashi, Yokohama, both of Japan

[73] Assignee: Chisso Corporation, Osaka, Japan

[21] Appl. No.: 469,780

[22] Filed: Jan. 24, 1990

[30] Foreign Application Priority Data

Feb. 2, 1989 [JP] Japan .................... 1-22497

[51] Int. Cl.$^5$ ............................................... C08K 3/02
[52] U.S. Cl. .................... 524/708; 524/719; 524/726; 524/728; 524/738; 524/742; 524/751; 524/755; 524/765; 524/770; 528/34; 528/41
[58] Field of Search .............. 528/41, 34; 524/726, 524/742, 728, 719, 708, 765, 755, 770, 738, 751

[56] References Cited

U.S. PATENT DOCUMENTS

| 4,499,252 | 2/1985 | Igarashi et al. | 528/41 |
| 4,609,700 | 9/1986 | Kunimune et al. | 528/41 |
| 4,970,283 | 11/1990 | Kunimune et al. | 528/26 |

Primary Examiner—Melvyn I. Marquis
Attorney, Agent, or Firm—Fred Philpitt

[57] ABSTRACT

The present invention is directed to a silicon polyimide precursor composition which has a viscosity suitable for the formation of films by application or another mean and which is capable of forming hard and tough films having excellent heat resistance, low coefficient of thermal expansion and strong adhesive force by heating the films, the above-mentioned films being formed by the chemical bond between silicon an dpolyimide. Another feature of the present invention is directed to a method for preparing a crosslinked/cured material of the aforesaid silicon polyimide precursor composition.

That is, the present invention is connected with a soluble silicon polyimide precursor composition which comprises 0.5 to 40% by weight of a silicon polyimide precursor represented by the following formula (I) on another precursor obtained by imidizing the compound represented by the formula (I) and having a logarithmic viscosity number of 0.05 to 5 dl/g, 0.5 to 40% by weight of a condensate of a silicon compound represented by the following formula (II) and having a logarithmic viscosity number of 0.01 to 0.5 dl/g, and 50 to 99% by weight of a solvent:

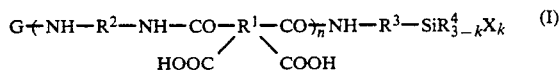

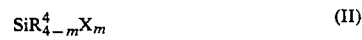

wherein G is

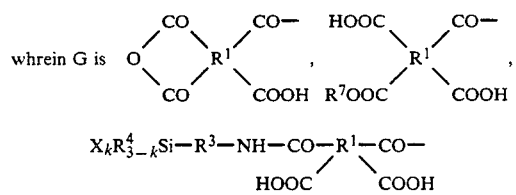

or a hydrogen atom (except the case of n=0), $R^1$ is independently a tetravalent carbon cyclic aromatic group, $R^2$ is independently a carbon cyclic aromatic group, $R^3$ is

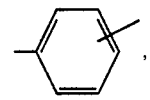

$R^4$ is independently methyl or phenyl, $R^7$ is independently alkyl having 1 to 6 carbon atoms or hydrogen, X is alkoxy, acetoxy or hydroxyl, n is n≧0, k is 2.5≦k≦3, and m is 3.5<m≦4.

6 Claims, No Drawings

SILICON POLYIMIDE PRECURSOR COMPOSITION

BACKGROUND OF THE INVENTION (1) Field of the Invention

The present invention relates to a silicon polyimide precursor composition and a method for preparing a crosslinked and cured material therefrom. More specifically, it relates to a silicon polyimide precursor which is tough and heat-resistant and which has higher hardness than organic compounds and by which undesirable brittleness of inorganic compounds is eliminated, and a method for preparing a crosslinked and cured material therefrom.

(2) Description of the Prior Art

Polyimide resins have maximum heat resistance and low coefficient of thermal expansion considering organic polymer compounds, but these characteristics are inferior to those of inorganic compounds. In order to improve surface hardness, wear resistance and the like of the polyimide resin with the intention of causing these properties to come up to those of inorganic compounds, a means for filling the polyimide resin with an inorganic material is taken. In this case, however, breakage is liable to occur at the interface between the inorganic material and the polyimide resin, and therefore such a means is not always preferable.

On the other hand, silica as an example of the inorganic materials has practically preferable characteristics, e.g., low coefficient of thermal expansion and high hardness in addition to excellent heat resistance, but it is brittle and poor in processability and moldability. For this reason, use applications of silica are limited.

For the purpose of improving the processability and moldability, a variety of compounds have been synthesized in which silicon bonds are partly replaced by alkyl groups.

This technique is successful to some extent, for example, as polydimethylsiloxanes and the like, but such compounds involve drawbacks such as noticeable deterioration of heat resistance, perceptible increase in coefficient of thermal expansion and outstanding degradation of hardness.

For the elimination of these drawbacks, many techniques of chemically combining polyimides with silicon compounds have been reported (e.g., Japanese Patent Laid-open Publication Nos. 143328/1982, 7473/1983 and 13631/1983). These techniques are based on the partial replacement of a diamine component which is a raw material of the polyimide by a polydisiloxane which is terminated with diamines at the both ends.

Japanese Patent Publication No. 32162/1983 has suggested a crosslinked polyimide having a siloxane group which can be prepared by mixing a polyamide acid which is terminated with reactive silicon compounds at both the ends thereof, with a polydisiloxane having hydroxyl groups at both ends thereof, and then heating the mixture.

Furthermore, as a process of forming silica films, there has been suggested a technique of heating a reactive silane such as an alkoxy silane or an acetoxy silane (e.g., Japanese Patent Publication No. 16488/1977 and 20825/1977, Japanese Patent Laid-open Publication Nos. 34258/1980 and 250032/1986, and U.S. Pat. No. 4,408,009).

In recent years, for the purpose of improving mechanical strength and dimensional stability of polyimide, a technique has been suggested which comprises mixing a polymide precursor varnish with a metallic alkoxide or its partial condensate to prepare a uniform solution, and then applying and heating the solution so as to form a polyimide film in which a metallic oxide is dispersed (e.g., Japanese Patent Laid-open Publication Nos. 99234/1988, 99235/1988, 172741/1988, 193935/1988, 199265/1988 and 291924/1988).

Products disclosed in the above-mentioned Japanese Patent Laid-open Publication Nos. 143328/1982, 7473/1983 and 13631/1983 still have disadvantages such as noticeable deterioration of heat resistance, perceptible increase in coefficient of thermal expansion and outstanding degradation of hardness, as in the above-mentioned polydimethylsiloxane and the like.

The compound disclosed in Japanese Patent Publication No. 32162/1983 is excellent in affinity for inorganic compounds but cannot provide any materials having low coefficients of thermal expansion.

With regard to the above-mentioned technique of heating a reactive silane such as alkoxy silane or an acetoxy silane, films synthesized by this technique are very brittle, and the thickness of the films is limited to at most several thousand angstroms.

In the technique disclosed in Japanese Patent Laid-open Publication Nos. 99234/1988, 99235/1988, 172741/1988, 193935/1988, 199265/1988 and the like as mentioned above, the polyimide film is substaitially a mere mixture of the polyimide and the metallic oxide, though it cannot be denied in some cases that the polyimide is partially chemically bonded to the metallic oxide by the addition of a coupling agent.

Therefore, when the content of metallic oxide is increased, the product tends to become opaque and nonuniform, and therefore the amount of metallic oxide is restricted, as a result, characteristics of polyimide can be improved only to some extent. The polyimide product suggested in Japanese Patent Laid-open Publication No. 291924/1988 has a drawback, poor heat resistance.

As discussed above, the conventional techniques have various problems, and thus it has been demanded to develop satisfactory materials having advantages of both inorganic materials and organic materials.

SUMMARY OF THE INVENTION

An object of the present invention is to provide a silicon polyimide precursor composition capable of producing hard and tough films having excellent heat resistance, low coefficient of thermal expansion and a strong adhesive force by heating thereof.

Another object of the present invention is to provide a silicon polyimide precursor composition having a viscosity suitable for forming a film by coating or the like.

A further object of the present invention is to provide a process for producing a crosslinked and cured product of the silicon polyimide precursor composition.

The present inventors have intensively researched to solve the conventional technical problems, and at last they have accomplished the present invention.

That is, the present invention is directed to a soluble silicon polyimide precursor composition which comprises 0.5 to 40% by weight of a silicon polyimide precursor represented by the formula (I) and having a logarithmic viscosity number of 0.05 to 5 dl/g as measured at a concentration of 0.5 g/dl at $30 \pm 0.01°$ C. in a solvent, 0.5 to 40% by weight of a condensate of a silicon compound represented by the formula (II) and having a logarithmic viscosity number of 0.01 to 0.5 dl/g, and 50 to 99% by weight of a solvent:

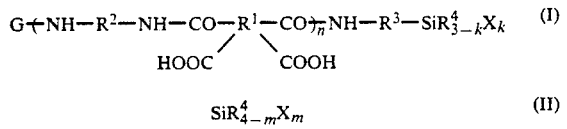

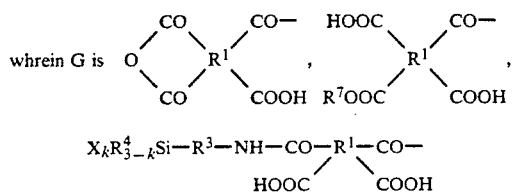

wherein G is

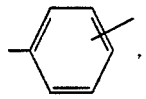

or a hydrogen atom (except the case of n=0), $R^1$ is independently a tetravalent carbon cyclic aromatic group, $R^2$ is independently a carbon cyclic aromatic group, $R^3$ is

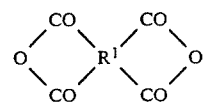

$R^4$ is independently methyl or phenyl, $R^7$ is independently an alkyl group having 1 to 6 carbon atoms or hydrogen, X is alkoxy, acetoxy or hydroxyl, n is $n \geq 0$, k is $2.5 \leq k \leq 3$, and m is $3.5 < m \leq 4$.

The above-mentioned logarithmic viscosity number is $\eta inh$ represented by the formula $$\eta_{inh} = \frac{\ln(\eta/\eta_o)}{C}$$

wherein $\eta$ is a viscosity measured at $30 \pm 0.01°$ C. at a concentration of 0.5 g/dl in a solvent by the use of a Ubbelohde's viscometer, $\eta_o$ is a viscosity of the solvent at the same temperature by the use of the same viscometer, and C is a concentration of 0.5 g/dl.

For convenience, the concentration of the condensate of the compound represented by the formula (II) is a concentration of a residual solid after the heating of its solution at 200° C. for 2 hours.

Moreover, the present invention is directed to a soluble silicon polyimide precursor composition which comprises 0.5 to 40% by weight of an imido group-containing soluble silicon polyimide precursor having a logarithmic viscosity number of 0.05 to 5 dl/g, the aforesaid precursor being obtained by heating a silicon imide precursor represented by the formula (I) to 50°-200° C. in the presence of a solvent to form an imide, or by chemically converting the precursor into an imide in the presence of a known imidation (imide formation) accelerator, 0.5 to 40% by weight of a condensate of a silicon compound represented by the formula (II) and having a logarithmic viscosity number of 0.01 to 0.5 dl/g, and 50 to 99% by weight of a solvent.

Another feature of the present invention is directed to a method for preparing a crosslinked silicon polyimide which comprises the steps of heating either of the above-mentioned soluble silicon polyimide precursor composition at 50° to 500° C. so as to evaporate the solvent and crosslink and cure the precursor.

When k and m in the formulae (I) and (II) are 3 and 4, respectively, an organic-inorganic intermediate film can be obtained which has particularly high hardness and is excellent in heat resistance.

As already disclosed in Japanese Patent Laid-open Publication No. 287926/1986, the precursor represented by the formula (I) is preferably obtained by reacting a tetracarboxylic dianhydride represented by the formula (III), a diamine represented by the formula (IV) and an aminosilane represented by the formula (V) in a solvent

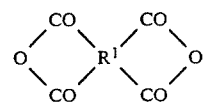

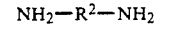

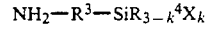

wherein $R^1$, $R^2$, $R^3$, $R^4$, X and k are as defined above.

$R^1$ is a carbon cyclic aromatic group and preferably has at least one six-membered ring. Furthermore, $R^1$ is particularly a monocyclic aromatic group, a condensed polycyclic aromatic group or a polycyclic aromatic group having several condensed rings or non-condensed rings (which are bonded to each other directly or through a crosslinking group).

Suitable examples of the crosslinking group include

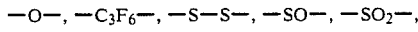

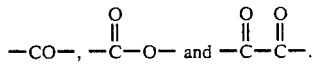

The carbon cyclic aromatic group represented by $R^1$ may be substituted by one or more of a trifluoromethyl group and a halogen atom (particularly a fluorine atom).

Preferable examples of the carbon cyclic aromatic group represented by $R^2$ include a monocyclic aromatic group, a condensed polycyclic aromatic group and a non-condensed bicyclic aromatic group. In the case of the non-condensed bicyclic aromatic group, the aromatic rings are bonded to each other through the crosslinking group. In this case, the usable crosslinking group is the same as enumerated in the previous description regarding $R^1$.

Preferably, $R^1$ is independently an unsubstituted monocyclic aromatic group, an unsubstituted condensed polycyclic aromatic group or an unsubstituted non-condensed bicyclic aromatic group. In the last group, the aromatic rings are preferably bonded to each other via a crosslinking agent such as —O— or —CO—.

On the other hand, it is preferred that $R^2$ is independently a monocyclic aromatic group or a non-condensed bicyclic aromatic group which may have one or more halogen atoms as substituents if desired, or an unsubstituted monocyclic aromatic group.

Examples of the tetracarboxylic dianhydride represented by the formula (III) are as follows:

Pyromellitic dianhydride, 3,3',4,4'-benzophenone-tetracarboxylic dianhydride, 2,3,3',4'-benzophenone-tetracarboxylic dianhydride, 2,2',3,3'-benzophenone-tetracarboxylic dianhydride, 3,3',4,4'-diphenyl-tetracarboxylic dianhydride, 2,2',3,3'-diphenyl-tetracarboxylic dianhydride, bis(3,4-dicarboxyphenyl)-ether dianhydride, bis(3,4-dicarboxyphenyl)-sulfone dianhydride, 3,3',4,4'-tetracarboxybenzoyloxybenzene dianhydride, 2,3,6,7-naphthalene-tetracarboxylic dianhydride, 1,2,5,6-naphthalene-tetracarboxylic dianhydride, 2,3,3',4'-biphenyltetracarboxylic dianhydride, and 2,2-bis(3,4-dicarboxyphenyl)hexafluoropropane.

As the diamines represented by the formula (IV), known compounds can be used.

Examples of the carbon cyclic aromatic diamines particularly include the following compounds:

o-, m- and p-phenylenediamines, 1,3-diamino-4-chlorobenzene, 1,4-diamino-2,5-dichlorobenzene, 1,4-diamino-2-bromobenzene, 4,4'-diaminodiphenyl ether, 4,4'-diaminodiphenyl thioether, 4,4'-diaminodiphenyl-sulfone, 3,3'-diaminodiphenylsulfone, 4,4'-diaminobenzoic acid phenylester, 2,2'-diaminobenzophenone, 4,4'-diaminobenzophenone, 4,4'-diaminobenzil, 1,8-diaminonaphthalene, 1,5-diaminonaphthalene, 1,5-diaminoanthraquinone, 3,4'-diaminodiphenyl ether, benzidine, bis[4-(4-aminophenoxy)phenyl]sulfone, 4,4'-bis(4-aminophenoxy)biphenyl, 2,2-bis[4-(4-aminophenoxy)-phenyl]hexafluoropropane, 1,4-bis(4-aminophenoxy)benzene and 1,3-bis(4-aminophenoxy)benzene.

Examples of the aminosilane represented by the formula (V) include the following compounds:

(3-aminophenyl)-di-n-propoxymethylsilane, (4-amino-phenyl)-tri-n-propoxysilane, 4-aminophenyl-trimethoxysilane, 3-aminophenyltrimethoxysilane, 4-aminophenyl-methyl-dimethoxysilane, 3-aminophenyl-di-methyl-methoxysilane and 4-aminophenyl-tri-ethoxysilane.

In the method of the present invention, preferable examples of the solvent (hereinafter referred to as "reaction solvent" at times), in which the reaction of the above-mentioned raw material compounds is performed and which is also used for measuring the above-mentioned logarithmic viscosity number, include N-methyl-2-pyrrolidone, N,N-dimethylacetamide, N,N-dimethylformamide, dimethylsulfoxide, tetramethyl urea, pyridine, dimethyl sulfone, hexamethylphosphoramide, methylformamide, N-acetyl-2-pyrrolidone, 2-methoxy ethanol, 2-ethoxy ethanol, 2-butoxy ethanol, diethylene glycol monomethyl ether, diethylene glycol dimethyl ether, cyclopentanone, cyclohexanone, N,N-dimethylformamide, N,N-dimethylmethoxyacetamide, tetrahydrofuran, N-acetyl-2-pyrrolidone, N-methyl-ε-caprolactam, tetrahydrothiophene dioxide (sulpholane).

The reaction of the present invention may be carried out in a mixed solvent which can be obtained by mixing the organic solvents as mentioned above. In addition, the above mentioned preferable organic solvent may be diluted with another aprotic (neutral) organic solvent such as an aromatic, an alicyclic or an aliphatic hydrocarbon, its chlorinated derivative (e.g., benzene, toluene, xylenes, cyclohexane, pentane, hexane, petroleum ether or methylene chloride), or dioxane.

Next, reference will be made to the synthesis process of the silicon polyimide precursor represented by the formula (I). The precursor can be obtained by reacting A mole of an acid anhydride represented by the formula (III), B mole of a diamine represented by the formula (IV) and C mole of an aminosilane represented by the formula (V) in the above-mentioned solvent.

In this case, it is preferred that A, B and C are within the following range defined by the formula:

$$\frac{C}{A+B+C} \geq 0.05$$

When reaction temperature is in the range of 0° to 50° C., the silicon polyimide precursor represented by the formula (I) can be obtained in most cases, but when the reaction temperature is elevated, for example, when the reaction is performed at 50° to 200° C. as disclosed in Japanese Patent Laid-open Publication No. 108627/1986, a part or all of amic acid is converted into an imido group by dehyration reaction, and simultaneously X at the terminal of the precursor is hydrolyzed on occasion, and further polymerization is made by siloxane condensation, thereby obtaining the imido group-containing soluble silicon polyimide precursor.

These reactions will be outlined in accordance with reaction formulae.

The amic acid in the parentheses of the formula (I) changes as follows:

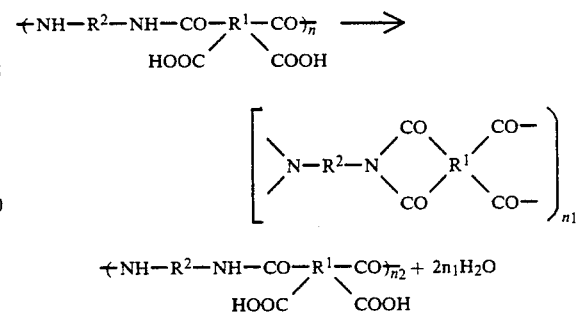

wherein $n_1 + n_2 = n$.

Furthermore, siloxane condensation proceeds at the terminal of the precursor with reference to the following reactions, so that polymerization takes place:

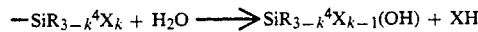

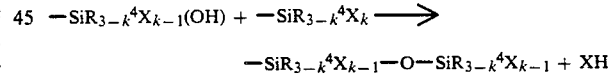

If X is a hydroxyl group, the same polymerization occurs by dehydration.

When the amic acid in the silicon polyimide precursor represented by the formula (I) is reacted with a tertiary amine such as pyridine, isoquinoline and the like by a known process using a dehydrating agent such as acetic anhydride and the like at a temperature in the vicinity of ordinary temperature, the imido group-containing soluble silicon polyimide precursor can be obtained, but in this case only, the former reaction takes place, and the latter siloxane condensation reaction does not occur.

Examples of the silicon compounds of the formula (II) are as follows:
Si(OCH$_3$)$_4$,
Si(CH$_3$)(OCH$_3$)$_3$,
Si(C$_6$H$_{13}$)(OCH$_3$)$_3$,
Si(CH$_3$)$_2$(OCH$_3$)$_2$,
Si(CH$_3$)$_3$(OCH$_3$),
Si(OC$_2$H$_5$)$_4$, Si(CH$_3$)(OC$_2$H$_5$)$_3$,
Si(CH$_3$)$_2$(OC$_2$H$_5$)$_2$,
Si(CH$_3$)$_3$(OC$_2$H$_5$),

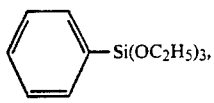—Si(OC$_2$H$_5$)$_3$,

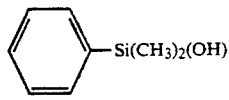—Si(CH$_3$)$_2$(OH)

and
Si(OCOCH$_3$)$_4$.

In the present invention, these soluble condensates can be used.

The soluble condensate can be synthesized by a known process or by performing reactions in a solvent, for example, an alcohol such as methanol, ethanol and the like or an alcohol ether such as 2-methoxy ethanol, 2-ethoxy ethanol, methyl carbitol, ethyl carbitol and the like in the presence of a catalyst, for example, an acid catalyst such as a mineral acid, an organic acid, acidic ion exchange resin and the like or an alkaline catalyst such as aqueous ammonia, tetramethylammonium hydroxide and the like at a temperature of ordinary temperature to 200° C., and if necessary, water is added thereto. These reactions are as follows:

$$SiR_{4-m}^4X_m + H_2O \longrightarrow SiR_{4-m}^4X_{m-1}(OH) + XH$$

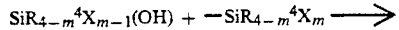
$$SiR_{4-m}^4X_{m-1}(OH) + -SiR_{4-m}^4X_m \longrightarrow$$

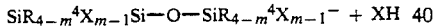
$$SiR_{4-m}^4X_{m-1}Si-O-SiR_{4-m}^4X_{m-1}^- + XH$$

Such a siloxane condensation reaction successively occurs to produce high molecular weight products.

However, where X is a hydroxyl group, dehydrogenation reaction occurs instead.

The silicon polyimide precursor thus synthesized represented by the formula (I) and/or the imido group-containing soluble silicon polyimide precursor [hereinafter the precursor or precursors are referred to as "component (I')"] and the condensate [hereinafter referred to as "component (II')"] of the silicon compound represented by the formula (II) are mixed and dissolved in one or more of the above-mentioned solvents or in another solvent to obtain the soluble silicon polyimide precursor composition of the present invention. As for the ratio of these components, the amount of the component (I') is in the range of 0.5 to 40% by weight, that of the component (II') is in the range of 0.5 to 40% by weight, and that of the solvent is in the range of 50 to 99% by weight.

The heating of their concentrations can be made as described above.

When the composition in which the content of the solvent is in excess of 99% by weight is applied to form films, the resulting films are too thin, and when the content of the solvent is less than 50% by weight, there are disadvantages that the composition has poor flowability and is not stable sometimes.

Each lower limit of the logalithmic viscosity number of components (I') and (II') denotes the lower limit of a practical film thickness and the lower limit of the respective components to exert characteristics of the composition regarding the present invention. Furthermore, each upper limit of the logarithmic viscosity number of components (I') and (II') denotes the upper limit of the respective components to have solubility to the solvent, to give stability to the solution and to exert other characteristics of the composition of the present invention.

The larger the ratio of the component (II')/the component (I') is and the greater the values of k and m are, the weaker the characteristics of the imide in the obtained structure are and the stronger the characteristics of the inorganic material (silica) are. Therefore, when the ratio of the component (II')/the component (I') is large, the coefficient of thermal expansion lowers, the heat resistance improves, and the hardness increases noticeably. On the contrary, the brittleness increases and the formation of thick films becomes difficult. When k is less than 2.5 or when m is less than 3.5, the heat resistance deteriorates, and when calcination is carried out at a higher temperature, the surface state of the films disadvantageously worsens.

In consequence, the above-mentioned range for the composition according to the present invention is practically preferable.

In order to manufacture molded articles by using the soluble silicon polyimide precursor composition of the present invention, any known coating method can be employed. For example, glass plates, copper plates or aluminum plates are coated with the composition of the present invention by dipping, spin coating or printing, followed by heating so as to remove a solvent and to advance crosslinking due to siloxane bond, resulting in hard and tough films.

Conditions for the heating depend upon a kind of solvent to be used and a thickness of films to be formed, but it is usually sufficient that heating temperature is from 50° to 500° C., preferably from 200° to 400° C. and heating time is from about 0.5 to about 2 hours.

According to such a method of the present invention, the crosslinked silicon polyimide can be manufactured.

The formation of laminated composite materials can be achieved by effecting successively such operations as described above. In this case, an adhesive such as varnish is applied between the plates of different plural kinds prior to the heating.

By impregnating a filler, glass fiber or the like with varnish, followed by heating and curing, a laminated material having the reinforced films can be manufactured.

The composition of the present invention is composed of the components having suitable logarithmic viscosity numbers, and therefore the viscosity of the composition is so proper that coating can be carried out successfully. Furthermore, the composition of the present invention is a mixture of a silicon polyimide precursor and a condensate of the silicon compound, but when the coating films of the composition are heated, the siloxane condensation reaction proceeds between these components, so that hard and tough films are formed owing to intermolecular bond and these films exhibit a strong adhesivity to glasses, ceramics, silicon wafers and various kinds of metallic oxides. In addition, the coefficient of thermal expansion can be lowered nearly to that of inorganic compounds, and therefore the composition can be preferably used as a laminate material together with an inorganic compound. Furthermore, the composition of the present invention is free from brittleness which is the drawback of the inorganic compound, and therefore the composition can be utilized as a surface coating material which permits forming thicker films and providing harder films as compared with organic films such as polyimide.

The crosslinked silicon polyimide manufactured from the soluble silicon polyimide precursor composition of the present invention by the crosslinking and curing method of the present invention is excellent in heat resistance and mechanical properties, electrical properties and adhesive properties. Therefore, the composition can be used as coating agents for glass, ceramics, silicon wafer, various metal oxides and the like; adhesive; composite structures produced by impregnating inorganic fiber such as glass fiber and the like with said composition followed by heating; and the like.

As concrete applications of the composition of the present invention, there can be considered various parts and protective films of electronic equipments, communication equipments, heavy electric apparatus and transportation devices, and they can be also used successfully as electronic materials such as liquid crystal aligning agents and the like.

EXAMPLES

Now, the present invention will be described in reference to reference examples, examples and comparative examples, but the scope of the present invention should not be limited to these examples, needless to say.

Preparation examples of silicon polyimide precursors used in the undermentioned examples will be described in Reference Examples 1 to 6, and preparation examples of silicon condensates will be described in Reference Examples 7 to 12.

REFERENCE EXAMPLE 1

A one liter-flask equipped with a stirrer, a dropping funnel, a condenser and a nitrogen replacing device was fixed in cold water. After the atmosphere in the flask was replaced with a nitrogen gas, 500 g of dehydrated and purified N-methyl-2-pyrrolidone (hereinafter referred to as "NMP"), 48.94 g (0.244 mole) of 4,4'-diaminodiphenyl ether (hereinafter referred to as "DDE") and 118.14 g (0.367 mole) of 3,3',4,4'-benzophenone tetracarboxylic dianhydride (hereinafter referred to as "BTDA") were added to the flask, and reaction was then effected at 10 to 40° C. for 6 hours. Afterward, 46.92 g (0.220 mole) of p-aminophenyltrimethoxysilane (hereinafter referred to as "p-APMS") was added thereto, and reaction was then carried out at 20° to 40° C. for 3 hours to obtain a polyamide acid solution having a logarithmic viscosity number of 0.33 dl/g in NMP.

REFERENCE EXAMPLES 2 to 5

The same devices and procedure as in Reference Example 1 were used except that the composition of the raw materials was changed, and the reaction was performed at the same concentrations. The results are set forth in Table 1.

REFERENCE EXAMPLE 6

The same devices and procedure as in Reference Example 1 were used except that 250 g of the polyamide acid solution in Reference Example 5 and the same amount of NMP were added. Afterward, the reaction was carried out at 100° C. for 2 hours.

With regard to the soluble polyimide precursor thus obtained, a logarithmic viscosity number in NMP was 1.6 dl/g, and an imide formation ratio measured by infrared absorption spectrum was 64%.

TABLE 1

| Reference Example | Raw Material | | | | Molar Ratio (1)/(2)/(3) | Logarithmic *10 Viscosity Number of Polyamide Acid |
|---|---|---|---|---|---|---|
| | Diacid Anhydride (1) | Diamine (2) | Aminosilane (3) | Solvent | | |
| 2 | BTDA | 3,3'-DDS *1 | p-APMS | Methyl carbitol | 8/7/1.8 | 0.48 |
| 3 | PMDA *2 | DDE | m-APMS *3 | NMP | | |
| 4 | 6FDA *4 | HF-BAPP *5 | p-APMS | DMAC *6 | 2/1/2 | 0.24 |
| 5 | DSDA *7 | BAPS *8 | p-APMS/ p-APMMS *9 | NMP | 6/5/1.6 15/14/(3:1) | 0.83 1.4 |

*1 3,3'-Diaminodiphenylsulfone
*2 Pyromellitic dianhydride
*3 m-Aminophenyltrimethoxysilane
*4 2.2-Bis(3,4-dicarboxyphenyl)hexafluoropropane dianhydride
*5 2.2-Bis[4-(4-aminophenoxy)phenyl]hexafluoropropane
*6 N,N-Dimethylacetamide
*7 Diphenylsulfone-3,3',4,4'-tetracarboxylic dianhydride
*8 Bis[4-(4-aminophenoxy)phenyl]sulfone
*9 p-Aminophenylmethyldimethoxysilane
*10 It was measured in a reaction solvent.

REFERENCE EXAMPLE 7

The same devices and procedure as in Reference Example 1 were used except that 200 g of methanol, 300 g of ethyl silicate, 10 g of acetic acid and 45 g of water were used and that reaction was effected at 60° to 80° C. for 20 hours. To the resulting solution was added 100 g of NMP, and it was then distilled under reduced pressure at a temperature of 60° C. or less so as to remove low-boiling components therefrom, thereby obtaining the NMP solution of an ethyl silicate condensate.

The logarithmic viscosity number of this condensate in NMP was 0.015 dl/g.

REFERENCE EXAMPLES 8 to 13

By the use of the same devices and procedure as in Reference Example 7 except that each composition of the raw materials was changed, the reaction was effected. The results are set forth in Table 2.

EXAMPLES 1 to 6, COMPARATIVE EXAMPLES 1 to 4

Each silicon polyimide precursor synthesized in Reference Examples 1 to 6 was mixed with each silicon condensate synthesized in Reference Examples 7 to 13 and a necessary amount of a solvent to prepare a soluble silicon polyimide composition of the present invention. The results are set forth in Table 3.

number of the polyamide acid varnish in NMP was 1.1.

TABLE 2

| Reference Example | Raw Material *1 | | | Reaction Solvent | Substituted Solvent | Logarithmic *2 Viscosity Number of Silicon Condensate |
|---|---|---|---|---|---|---|
| | Silicon Compound | | | | | |
| 8 | Methyl silicate 300 g | | | Methanol 200 g | Methyl carbitol 100 g | 0.013 |
| 9 | Ethyl silicate 280 g | Dimethyl-dimethoxy-silane 20 g | | Methanol 200 g | NMP 100 g | 0.14 |
| 10 | Methyl silicate 270 g | Trimethyl-ethoxysilane 30 g | | Methanol 200 g | NMP 100 g | 0.080 |
| 11 | Ethyl silicate 270 g | Dimethyldi-ethoxysilane 20 g | Trimethyl-ethoxysilane 10 g | Methanol 200 g | NMP 100 g | 0.18 |
| 12 | Reaction solution synthesized in the same manner as in Reference Example 7 | | | | DMAC 100 g | 0.15 |
| 13 | Methyltri-methoxy-silane 300 g | | | Methanol 200 g | NMP 100 g | 0.041 |

*1 Further, 10 g of water and 45 g of acetic acid were added.
*2 It was measured in the substituted solvent.

TABLE 3

| Example or Comp. Example | Silicon Polyimide Precursor | | Silicon Condensate | | Solvent (wt %) | k | m |
|---|---|---|---|---|---|---|---|
| | Ref. Ex. | wt % | Ref. Ex. | wt % | | | |
| Ex. 1 | 1 | 10 | 7 | 3 | NMP 35 2-Methoxy-ethanol 45 Ethanol 7 | 3 | 4 |
| Ex. 2 | 2 | 5 | 8 | 8 | Methyl carbitol 80 Methanol 7 | 3 | 4 |
| Ex. 3 | 3 | 6 | 9 | 4 | NMP 40 2-Methoxy-ethanol 45 Methanol 5 | 3 | 3.78 |
| Ex. 4 | 4 | 5 | 12 | 6 | DMAC 30 Methyl carbitol 50 Methanol 9 | 3 | 4 |
| Ex. 5 | 5 | 3 | 10 | 15 | NMP 30 Ethyl carbitol 45 Ethanol 7 | 2.75 | 3.63 |
| Ex. 6 | 6 | 2 | 11 | 18 | NMP 35 Ethyl carbitol 38 Methanol 7 | 2.75 | 3.65 |
| Comp. Ex. 1 | Comp. Refer. Ex. | 6 | 10 | 4 | NMP 40 Ethyl carbitol 45 Methanol 5 | — | 3.63 |
| Comp. Ex. 2 | Refer. Ex. 1 | 10 | | | NMP 90 | 3 | — |
| Comp. Ex. 3 | | | Refer. Ex. 7 | 6 | Methanol 10 2-Ethoxy ethanol 84 | — | 4 |
| Comp. Ex. 4 | 5 | 6 | 13 | 4 | NMP 30 Ethyl carbitol 53 Methanol 7 | 2.75 | 3 |

In Comparative Example 1 which was a comparative reference example, a polyamide acid varnish was synthesized by the same procedure as in Reference Example 1 except that PMDA/DDE in NMP was 1 and that no aminosilane was used, and the logarithmic viscosity

EXAMPLE 7

Each of the compositions prepared in Examples 1 to 6 and Comparative Examples 1 to 4 was applied onto a glass plate, and heating was then carried out at 100° C. for 30 minutes and at 450° C. for 1 hour in an electric furnace, so that a film having a thickness of about 1.5 μm was formed on the glass plate. For the films thus formed, measurements were made to inspect coating properties, surface hardness (pencil hardness JIS K5400) and heat resistance in terms of weight reduction when heated at a high temperature and the results are set forth in Table 4.

Test of Coating Properties

Each composition was filtered through a 0.2-μm filter to remove dust therefrom, and it was dropped onto a glass plate. Afterward, spin coating was effected by a spinner. The glass plate having the coating film thereon was then heated at 100° C. for 30 minutes and at 450° C. for 1 hour in an electric furnace to form a cured film. Afterward, the film was subjected to visual inspection.

If all of the following requirements are met, the film was estimated to be "good".

(1) The film is formed in a substantially uniform thickness all over the glass plate.
(2) The surface of the film is smooth.
(3) No cracks takes place.

In Table 4, the reduction of weight is shown as "weight reduction (%)" which was obtained by measuring the reduction of film weight when the temperature was elevated from ordinary temperature to 700° C. at a temperature rise rate of 10° C./minute by the use of a thermobalance TGD 5000 made by Shinku Riko Co., Ltd.

TABLE 4

| Coating Film Test | Coating Solution | Coating Properties | Surface Hardness | Weight Reduction (%) |
|---|---|---|---|---|
| 1 | Ex. 1 | Good | 8 H | 24.1 |
| 2 | Ex. 2 | " | ≧9 H | 17.7 |
| 3 | Ex. 3 | " | " | 18.0 |
| 4 | Ex. 4 | " | " | 12.4 |
| 5 | Ex. 5 | " | " | 11.5 |
| 6 | Ex. 6 | " | " | 9.3 |
| 7 | Comp. Ex. 1 | Rough surface | — | 48.5 |
| 8 | Comp. Ex. 2 | Good | 3 H | 41.9 |
| 9 | Comp. Ex. 3 | Cracked | ≧9 H | 2.3 |
| 10 | Comp. Ex. 4 | Rough surface | ≧9 H | 49.4 |

EXAMPLE 8

Each of the compositions prepared in Examples 1 to 6 and Comparative Examples 1 to 4 was applied onto 5-inch silicon wafer, and the latter was then heated at 100° C. for 30 minutes and at 450° C. for 1 hour in an electric furnace, thereby forming a coating film on the wafer. When the film was thin, the application and heating were repeated so as to form the film having a thickness of about 5 μm.

Afterward, the wafers were observed, and it was perceived that the wafers coated with the compositions prepared in Examples 1 to 6 had no warp, whereas as for both the wafers coated with the compsitions prepared in Comparative Examples 1 and 2, warp was seen.

Furthermore, with regard to the composition in Coparative Example 3, some cracks occurred, and thus the formation of the film was not possible.

The above-mentioned results indicate that the films obtained from the compositions of the present invention had low coefficient of thermal expansion which is very close to that of silicon wafers [4.2×10⁻⁶/° C., "Semiconductor Handbook" published by Ohm Co., Ltd. in Japan].

What is claimed is:

1. A soluble silicon polyimide precursor composition which comprises 0.5 to 40% by weight of a silicon polyimide precursor represented by the following formula (I) and having a logarithmic viscosity number of 0.05 to 5 dl/g as measured at a concentration of 0.5 g/dl at 30±0.01° C. in a solvent, 0.5 to 40% by weight of a soluble condensate of a silicon compound represented by the following formula (II) and having a logarithmic viscosity number of 0.01 to 0.5 dl/g, and 50 to 99% by weight of a solvent:

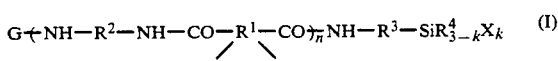

wherein G is

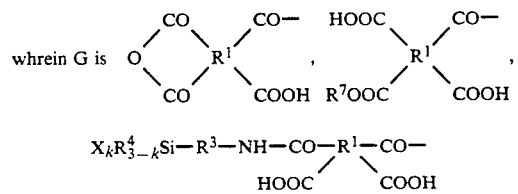

or a hydrogen atom except in the case of n=0, $R^1$ is independently a tetravalent carbon cyclic aromatic group, $R^2$ is independently a carbon cyclic aromatic group, $R^3$ is

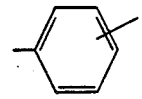

$R^4$ is independently methyl or phenyl, $R^7$ is independently alkyl having 1 to 6 carbon atoms or hydrogen, X is alkoxy, acetoxy or hydroxyl, n is $n \geq 0$, k is $2.5 \leq k \leq 3$, and m is $3.5 < m \leq 4$, the above-mentioned logarithmic viscosity number is ηinh represented by the formula $$\eta_{inh} = \frac{\ln(\eta/\eta_o)}{C}$$

wherein η is the viscosity measured at 30±0.01° C. at a concentration of 0.5 g/dl in a solvent by the use of a Ubbelohde's viscometer, $\eta_o$ is the viscosity of the solvent at the same temperature by the use of the same viscometer, and C is a concentration of 0.5 g/dl, and the concentration of the condensate of the compound represented by the formula (II) is the concentration of a residual solid after the heating of its solution at 200° C. for 2 hours.

2. A soluble silicon polyimide precursor composition which comprises 0.5 to 40% by weight of an imido group-containing soluble silicon polyimide precursor having a logarithmic viscosity number of 0.05 to 5 dl/g, said precursor being obtained by heating a silicon polyimide precursor represented by the formula (I) of claim 1 at 50° to 200° C. in the presence of a solvent to form an imide or by chemically converting the precursor into an imide in the presence of a known imide formation accelerator, 0.5 to 40% by weight of a soluble condensate of a silicon compound represented by the formula (II) of claim 1 and having a logarithmic viscosity number of 0.01 to 0.5 dl/g, and 50 to 99% by weight of a solvent.

3. A soluble silicon polyimide precursor composition according to claim 1 wherein k is 3 and m is 4.

4. A soluble silicon polyimide precursor composition according to claim 2 wherein k is 3 and m is 4.

5. A method for preparing a crosslinked silicon polyimide which comprises the step of heating the soluble silicon polyimide precursor composition described in claim 1 at a temperature of 50° to 500° C. to evaporate a solvent simultaneously with crosslinking and curing the precursor.

6. A method for preparing a crosslinked silicon polyimide which comprises the step of heating the soluble silicon polyimide precursor composition described in claim 2 at a temperature of 50° to 500° C. to evaporate a solvent simultaneously with crosslinking and curing the precursor.

* * * * *